UNITED STATES PATENT OFFICE.

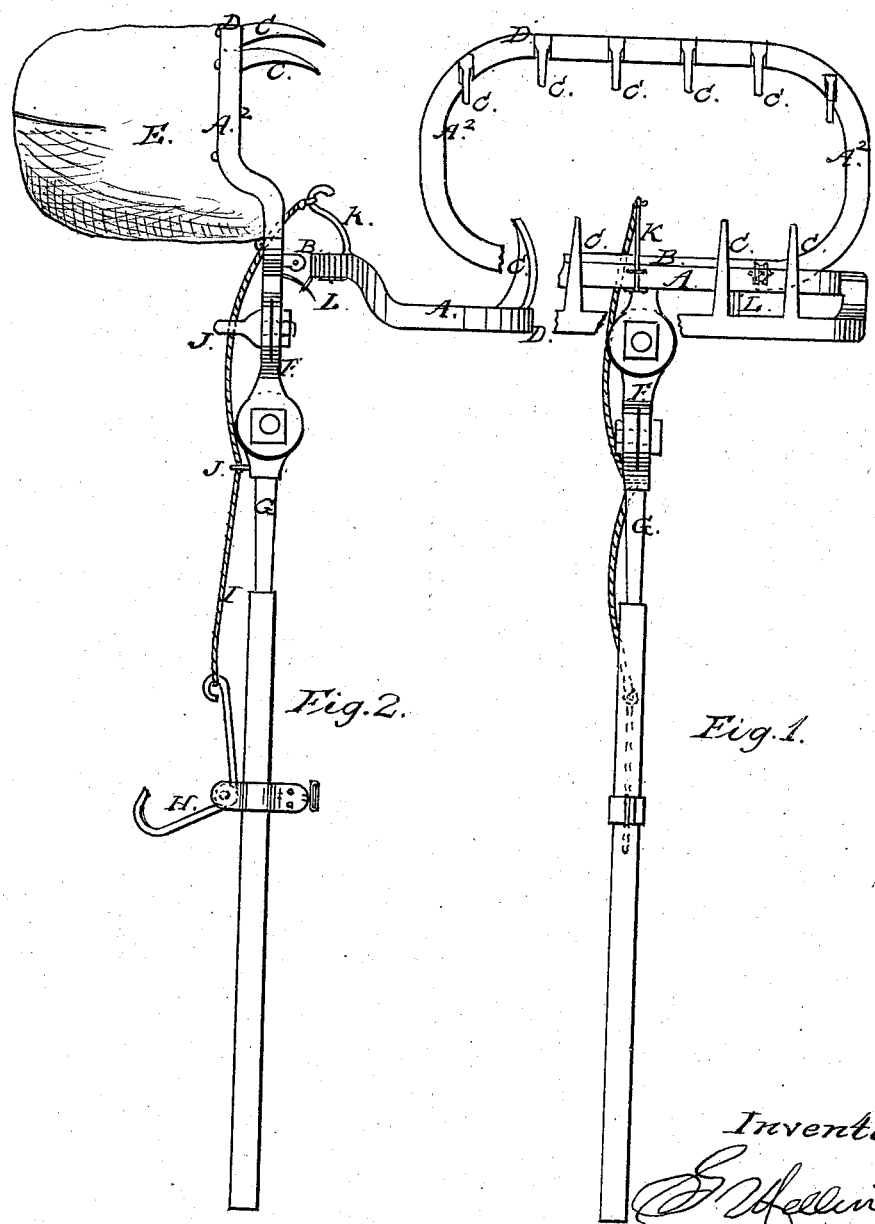
S. MELLINGER, Jr.
Fruit-Gatherer.
No. 56,972
Patented Aug. 7, 1866.

S. MELLINGER, JR., OF MOUNT PLEASANT, PENNSYLVANIA.

IMPROVEMENT IN FRUIT-GATHERERS.

Specification forming part of Letters Patent No. 56,972, dated August 7, 1866.

*To all whom it may concern:*

Be it known that I, S. MELLINGER, Jr., of Mount Pleasant, Westmoreland county, State of Pennsylvania, have invented new and useful Improvements in Fruit Gatherers or Pickers; and I do hereby declare that the following is a full, clear, and exact description thereof, which will enable others skilled in the art to make and use the same, reference being had to the accompanying drawings, forming part of this specification.

The present invention relates to a novel and useful implement for the gathering and picking of fruit from trees, whereby the fruit can be gathered with great rapidity, and with the utmost ease and facility, and without injuring it in the least degree—advantages of the utmost importance.

In accompanying plate of drawings my improved fruit-picker is illustrated, Figure 1 being a plan or top view of the same, and Fig. 2 a side view.

Similar letters of reference indicate like parts.

A $A^2$ in the drawings represent two frames, made of a similar shape and hinged together at B, with a series of teeth, c, upon and along the same sides D of each, that, as the frames are swung toward each other, interlock. To one of the frames, $A^2$, a bag, E, is secured, of any suitable size for holding the fruit gathered. The lower frame, $A^2$, is pivoted to an arm or piece, F, so as to swing thereon, and then this arm, in turn, pivoted to one end of the handle G, so as to swing in a plane at right angles to the other joint, the object of which double-jointing is to enable the frames A $A^2$ to be elevated or depressed, and swung either to the right or left, so as to bring the frames level, whether in the tree, or on the ground and reaching up to the tree, the importance of which is obvious.

H is a trigger hung to the under side of handle G, one end of which trigger is connected, through a cord, I, passing along the handle, and through eyes J of the same, to the upper frame, $A^2$, to an arm, K, of which it is hung. By pulling this trigger H in the proper direction the frame A can be brought down and toward the other frame, $A^2$, from which it is swung back, when the hand is released from the trigger through a bent spring, L, properly arranged upon the lower frame, $A^2$, and connected with the upper frame, A.

The manner in which the picker above described is used is as follows: The frames A $A^2$ are brought to a position sufficiently close to the fruit that if brought together by pulling upon the trigger they will incase the fruit within them, with its stem between the teeth, when, pulling upon the frames through the handle to which they are connected, the stem of the fruit is broken, and the fruit drops into the bag or receiver upon the lower frame. When the trigger is released and the frames swinging open the picker is again used as before, and so on, as long as may be desired.

The handle of the picker may be made in sections or parts, so as to be lengthened or shortened at pleasure.

I claim as new and desire to secure by Letters Patent—

1. The combination of the toothed jaws or frames A $A^2$, hinged together, with a bag or receiver secured to one, when the whole is swiveled or pivoted to a suitable handle, so as to swing in right-angular planes thereon, substantially as and for the purpose described.

2. The trigger and cord connecting it with the jaw or frame $A^2$, as and for the purpose specified.

SAMUEL MELLINGER, JR.

Witnesses:
JOHN S. TRUXEL,
ELI CROWES.